(12) United States Patent
Seifi et al.

(10) Patent No.: US 10,510,156 B2
(45) Date of Patent: Dec. 17, 2019

(54) METHOD AND APPARATUS FOR ESTIMATING DEPTH OF UNFOCUSED PLENOPTIC DATA

(71) Applicant: InterDigital CE Patent Holdings, Paris (FR)

(72) Inventors: Mozhdeh Seifi, Thorigne-Fouillard (FR); Neus Sabater, Betton (FR); Valter Drazic, Betton (FR)

(73) Assignee: InterDigital CE Patent Holdings, Paris (FR)

( * ) Notice: Subject to any disclaimer, the term of this patent is extended or adjusted under 35 U.S.C. 154(b) by 249 days.

(21) Appl. No.: 15/531,408

(22) PCT Filed: Nov. 24, 2015

(86) PCT No.: PCT/EP2015/077531
§ 371 (c)(1),
(2) Date: May 26, 2017

(87) PCT Pub. No.: WO2016/083393
PCT Pub. Date: Jun. 2, 2016

(65) Prior Publication Data
US 2017/0330339 A1   Nov. 16, 2017

(30) Foreign Application Priority Data
Nov. 26, 2014   (EP) .................................... 14306887

(51) Int. Cl.
*G06K 9/00*   (2006.01)
*G06T 7/557*   (2017.01)

(52) U.S. Cl.
CPC .... *G06T 7/557* (2017.01); *G06T 2207/10024* (2013.01); *G06T 2207/10052* (2013.01)

(58) Field of Classification Search
CPC combination set(s) only.
See application file for complete search history.

(56) References Cited

U.S. PATENT DOCUMENTS

2008/0131019 A1*  6/2008  Ng ............................ G06T 5/50
                                                           382/255
2013/0120605 A1*  5/2013  Georgiev .............. G06T 15/205
                                                           348/222.1

(Continued)

FOREIGN PATENT DOCUMENTS

JP          2013178684          9/2013

OTHER PUBLICATIONS

Chiang et al., "Light Field Data Processor Design for Depth Estimation Using Confidence-Assisted Disparities", IEEE 26th International SOC Conference, Erlangen, Germany, Sep. 4, 2013, pp. 129-133.

(Continued)

*Primary Examiner* — Alex Kok S Liew
(74) *Attorney, Agent, or Firm* — Lily Neff

(57) ABSTRACT

Methods and apparatus for estimating a depth of unfocused plenoptic data are suggested. The method includes: determining a level of homogeneity of micro-lens images of unfocused plenoptic data; determining pixels of the micro-lens images of the unfocused plenoptic unfocused plenoptic data which either have disparities equal to zero or belong to homogeneous areas as a function of the calculated level of homogeneity of the micro-lens images of the unfocused plenoptic data; and estimating the depth of the unfocused plenoptic data by a disparity estimation without considering the determined pixels. With the disclosure, by pre-processing the raw data, it can prevent any disparity estimation method to spend time on estimating disparities for: (i) pixels that are in focus, (ii) pixels that belong to homogenous areas of the scene.

15 Claims, 14 Drawing Sheets

(56) References Cited

U.S. PATENT DOCUMENTS

| | | | | |
|---|---|---|---|---|
| 2015/0234865 A1* | 8/2015 | Iida | ................... | G06F 16/5866 348/349 |
| 2015/0294472 A1* | 10/2015 | Putraya | .................. | G06T 7/557 382/154 |
| 2015/0319456 A1* | 11/2015 | Le Floch | ............. | H04N 19/196 375/240.12 |

OTHER PUBLICATIONS

Chen et al., "Depth Estimation of Light Field Data from Pinhole-masked DSLR Cameras", 2010 IEEE 17th International Conference on Image Processing, Hong Kong, Sep. 26, 2010, pp. 1769-1772.

Tulyakov et al., "Quadratic Formulation of Disparity Estimation Problem for Lightfield Camera", 10th IEEE International Conference on Image Processing, Melbourne, Australia, Sep. 15, 2013, pp. 2063-2067.

Uliyar et al., "Fast EPI Based Depth for Plenoptic Cameras", 10th IEEE International Conference on Image Processing, Melbourne, Australia, Sep. 15, 2013, pp. 1-4.

Kim et al., "Scene Reconstruction from High Spatio-Angular Resolution Light Fields", ACM Transactions on Graphics (TOG), vol. 32, No. 4, Article No. 73, Jul. 2013, pp. 1-11.

Wanner et al., "Variational Light Field Analysis for Disparity Estimation and Super-Resolution", IEEE Transactions on Pattern Analysis and Machine Intelligence, vol. 36, No. 3, Mar. 2014, pp. 606-619.

Bishop et al., "Full-Resolution Depth Map Estimation from an Aliased Plenoptic Light Field", 10th Asian Conference on Computer Vision, Queenstown, New Zealand, Nov. 8, 2010, pp. 186-200.

Sabater et al., "Accurate Disparity Estimation for Plenoptic Images", European Conference on Computer Vision, Zurich, Switzerland, Sep. 6, 2014, pp. 1-12.

Steffens et al., "Probabilistic Scene Analysis for Robust Stereo Correspondence", International Conference on Image Analysis and Recognition, Halifax, Canada, Jul. 6, 2009, pp. 697-706.

\* cited by examiner

METHOD AND APPARATUS FOR ESTIMATING DEPTH OF UNFOCUSED PLENOPTIC DATA

This application claims the benefit, under 35 U.S.C. § 365 of International Application PCT/EP2015/077531, filed Nov. 24, 2015, which was published in accordance with PCT Article 21(2) on Jun. 2, 2016 in English and which claims the benefit of European patent application No. 14306887.2 filed Nov. 26, 2014.

TECHNICAL FIELD

The present disclosure relates to the technology of light field, and in particular to a method and an apparatus for estimating a depth of unfocused plenoptic data.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

A light field is a concept proposed in the computer graphics and vision technology, which is defined as all the light rays at every point in space travelling in every direction. A light-field camera, also called a plenoptic camera, is a type of camera that uses a microlens array to capture 4D (four-dimensional) light field information about a scene because every point in the three-dimensional space is also attributed a direction. A light field cameras has microlens arrays just in front of the imaging sensor, which may consist of many microscopic lenses with tiny focal lengths and split up what would have become a 2D-pixel (length and width) into individual light rays just before reaching the sensor. This is different from a conventional camera which only uses the two available dimensions of the film/sensor. The resulting raw image captured by a plenoptic camera is a composition of many tiny images since there are microlenses.

A plenoptic camera can capture the light field information of a scene. The light field information then can be post-processed to reconstruct images of the scene from different point of views after these images have been taken. It also permits a user to change the focus point of the images. As described above, compared to a conventional camera, a plenoptic camera contains extra optical components to achieve the mentioned goal.

The plenoptic data captured by an unfocused plenoptic camera are known as the unfocused (type 1) plenoptic data, and those captured by a focused plenoptic camera are known as the focused (type 2) plenoptic data.

In a type 1 plenoptic camera (like Lytro), an array of micro-lenses is placed in front of the sensor. All the micro-lenses have the same focal length and the array of the micro-lenses is placed one focal length away from the sensor. This configuration obtains maximum angular resolution and low spatial resolution.

Having several aligned views of the scene, one intuitive application of the type 1 plenoptic data captured by an unfocused plenoptic camera is to estimate the depth of the scene. Known solutions of depth estimation are usually performed by estimating the disparity of pixels between the views.

One exemplary algorithm, the block-matching method, was discussed in the reference written by N. Sabater, V. Drazic, M. Seifi, G. Sandri, and P. Perez, "Light field demultiplexing and disparity estimation," HAL, 2014 (hereinafter referred to as reference 1).

More specifically, in the algorithm of the reference 1, first different images of the scene from different points of a view are extracted from the captured plenoptic data. Then, by extracting all the views of the plenoptic data, a matrix of views is reconstructed from the plenoptic data. This matrix of views is then used to estimate the depth of scene objects in view of the fact that the displacement of every pixel on different views is proportional to the depth of the corresponding object.

Estimating methods of the known solutions for unfocused plenoptic data are usually time consuming and not very accurate on non-textured areas.

Another exemplary depth estimation method, which is based on Epipolar Images of the scene, is discussed in the reference written by S. Wanner and B. Goldleuke, "Variational light field analysis for disparity estimation and super-resolution", IEEE transaction of pattern analysis and machine intelligence, 2013 (hereinafter referred to as reference 2). The reference 2 proposes to calculate the structure tensor (gradients) to decide which pixels are used to estimate the disparities.

However, the depth estimation method in reference 2 is proposed for plenoptic data captured by a focused camera, which is therefore not optimal for unfocused plenoptic data due to the low resolution of the Epipolar images.

SUMMARY

The present disclosure addresses at least some of the above mentioned drawbacks. The present disclosure will be described in detail with reference to exemplary embodiments. However, the present disclosure is not limited to the embodiments.

According to a first aspect of the present disclosure, there is provided a method for estimating a depth of unfocused plenoptic data. The method includes: determining a level of homogeneity of micro-lens images of unfocused plenoptic data; determining pixels of the micro-lens images of the unfocused plenoptic data which either have disparities equal to zero or belong to homogeneous areas as a function of the determined level of homogeneity of the micro-lens images of the unfocused plenoptic data; and estimating the depth of the unfocused plenoptic data by a disparity estimation of the micro-lens images of the unfocused plenoptic data except the determined pixels.

In an embodiment, the level of the homogeneity of each microlens image can be determined by estimating a measure of homogeneity from each microlens image, and assigning the estimated metric to all of the pixels of the corresponding microlens image. In the embodiment, a homogeneity image is created.

In an embodiment, the level of the homogeneity of each microlens image can be determined by calculating standard deviations of the pixels in that microlens image on three color channels, and assigning the estimated metric to all of the pixels of the corresponding microlens image. In the embodiment, a homogeneity image is created.

In an embodiment, a matrix of metric views can be determined from the created homogeneity image by: estimating from the unfocused plenoptic data a position of a center of each micro-lens of a plenoptic camera capturing the unfocused plenoptic data; and demultiplexing for all angular coordinates (u,v) the corresponding metric view (u,v) of the homogeneity image by extracting from every microlens image in the homogeneity image the pixel at the spatial coordinate (u,v) with respect to the center of every micro-lens image.

In an embodiment, the level of the homogeneity of each microlens image can be determined from a matrix of views of the unfocused plenoptic data to represent the light field of the views, by calculating a measure of homogeneity (for example standard deviation) of the corresponding pixels of each microlens image on the plurality of views in the matrix of views on three color channels. In the embodiment, the corresponding pixels for mircolens image at spatial coordinates (x,y) on the raw data are determined considering all of the pixels at spatial positions (x,y) on all of the views of the matrix of views. In the embodiment, the matrix of metrics iscreated.

In an embodiment, the matrix of view can be determined by: estimating from the unfocused plenoptic data a position of a center of each micro-lens of a plenoptic camera capturing the unfocused plenoptic data; and demultiplexing for all angular coordiantes (u,v) the corresponding view (u,v) of the unfocused plenoptic data by extracting from every microlens image the pixel at the spatial coordinate (u,v) with respect to the center of every micro-lens image.

In an embodiment, the level of the homogeneity of each microlens image can be determined by estimating a measure of homogeneity considering the corresponding pixels for each microlens image in the matrix of views, and assigning the estimated metric to all of the pixels of the corresponding pixels for each microlens image. In the embodiment, a matrix of metric views is created.

In an embodiment, the pixels can be determined by thresholding the values in the determined homogeneity image.

In an embodiment, the pixels can be determined by thresholding the values in the determined matrix of metric views.

In an embodiment, it further comprises processing the thresholded matrix of metric views to fill the empty pixels with morphological filters to form a processed matrix used for the disparity estimation.

In an embodiment, the level of the homogeneity of a micro-lens image can be determined by calculating standard deviations of micro-lens images on three color channels. The pixels of the corresponding microlens image share the estimated homogeneity metric (e.g., the standard deviation). Another example is to consider the DCT transform of the micro-lens images, and sum of the energy of the signal in the high frequency band gives one measure of homogeneity.

In an embodiment, the metric (e.g., standard deviation) estimated for each micro-lens image is assigned to all of the pixels of that microlens, therefore every pixel in the raw data has a homogeneity measure assigned to it. The collection of these pixels gives a homogeneity image similar to the raw data in dimensions.

In an embodiment, the matrix of the homogeneity measures can be determined by: estimating from the raw unfocused plenoptic data a position of a center of each micro-lens of a plenoptic camera capturing the unfocused plenoptic data; and demultiplexing a view of the homogeneity image by extracting a pixel from every micro-lens image. This approach gives the matrix of homogeneity metrics.

In an embodiment, the decision of having homogeneous pixels can be determined by thresholding the reconstructed matrix of the estimated metric (e.g., standard deviation, or high frequency energy of the DCT transform).

In an embodiment, it can further comprise processing the reconstructed matrix to fill the empty pixels with morphological filters to form a processed matrix used for the disparity estimation.

According to a second aspect of the present disclosure, there is provided an apparatus for estimating a depth of unfocused plenoptic data. The apparatus includes: a first determining unit for determining a level of an homogeneity of micro-lens images of unfocused plenoptic data; a second determining unit for determining pixels of the micro-lens images of the unfocused plenoptic data which either have disparities equal to zero or belong to homogeneous areas as a function of the calculated level of homogeneity of the micro-lens images of the unfocused plenoptic data; and an estimating unit for estimating the depth of the unfocused plenoptic data by a disparity estimation without considering the determined pixels.

In an embodiment, the first determining unit is configured to determine the level of the homogeneity by estimating a measure of homogeneity from each microlens image, and assigning the estimated metric to all of the pixels of the corresponding microlens.

In an embodiment, the first determining unit is configured to determine a matrix of metrics from the created homogeneity image by: estimating from the unfocused plenoptic data a position of a center of each micro-lens of a plenoptic camera capturing the unfocused plenoptic data; and demultiplexing for all angular coordiantes (u,v) the corresponding metric view (u,v) of the homogeneity image by extracting from every microlens image in the homogeneity image the pixel at the spatial coordinate (u,v) with respect to the center of every micro-lens image.

In an embodiment, the first determining unit is configured to determine the level of the homogeneity of each microlens image from a matrix of views of the unfocused plenoptic data to represent the light field of the views, by calculating a measure of homogeneity (for example standard deviation) of the corresponding pixels of each microlens image on the plurality of views in the matrix of views on three color channels. In the embodiment, the corresponding pixels for mircolens image at spatial coordinates (x,y) on the raw data are determined considering all of the pixels at spatial positions (x,y) on all of the views of the matrix of views.

In an embodiment, the first determining unit is configured to determine the matrix of views by: estimating from the unfocused plenoptic data a position of a center of each micro-lens of a plenoptic camera capturing the unfocused plenoptic data; and demultiplexing for all angular coordiantes (u,v) the corresponding view (u,v) of the unfocused plenoptic data by extracting from every microlens image the pixel at the spatial coordinate (u,v) with respect to the center of every micro-lens image.

In an embodiment, the second determining unit is configured to determine pixels by thresholding the determined matrix of metrics.

In an embodiment, the first determining unit is configured to process the thresholded reconstructed matrix of metrics to fill the empty pixels with morphological filters to form a processed matrix used for the disparity estimation.

In an embodiment, the first determining unit can be configured to determine the level of the homogeneity by reconstructing a matrix of homogeneity metrics of the plenoptic data to represent the light field of the views.

In an embodiment, the first determining unit can be configured to determine the level of the homogeneity of each microlens image from a matrix of views of the unfocused plenoptic data to represent the light field of the views, by calculating a measure of homogeneity (for example standard deviation) of the corresponding pixels of each microlens image on the plurality of views in the matrix of views on three color channels. The corresponding pixels for mircolens image at spatial coordinates (x,y) on the raw data are determined considering all of the pixels at spatial positions (x,y) on all of the views of the matrix of views (creating the matrix of metrics).

In an embodiment, the first determining unit can be configured to determine the level of the homogeneity by: estimating from the unfocused plenoptic data a position of a center of each micro-lens of a plenoptic camera capturing the unfocused plenoptic data; and demultiplexing a view of the unfocused plenoptic data by extracting a pixel from every micro-lens image.

In an embodiment, the first determining unit can be configured to determine the level of the homogeneity by calculating standard deviations of micro-lens images on three color channels.

In an embodiment, the second determining unit can be configured to determine pixels by thresholding the reconstructed matrix of metrics.

In an embodiment, the first determining unit can be configured to process the reconstructed matrix to fill the empty pixels with morphological filters to form a processed matrix used for the disparity estimation.

According to a third aspect of the present disclosure, there is provided a computer program comprising program code instructions executable by a processor for implementing the steps of a method according to the first aspect of the disclosure.

According to a fourth aspect of the present disclosure, there is provided a computer program product which is stored on a non-transitory computer readable medium and comprises program code instructions executable by a processor for implementing the steps of a method according to the first aspect of the disclosure.

BRIEF DESCRIPTION OF THE DRAWINGS

The above and other objects, features, and advantages of the present disclosure will become apparent from the following descriptions on embodiments of the present disclosure with reference to the drawings, in which:

FIGS. 7a and 7b illustrate the standard deviation matrix for the Red channel and a zoom in;

FIGS. 8a and 8b illustrate the standard deviation matrix for the Green channel and a zoom in;

FIGS. 9a and 9b illustrate the standard deviation matrix for the Blue channel and a zoom in;

FIGS. 10a and 10b illustrate the thresholded binary mask and a zoom in;

FIGS. 11a and 11b illustrate the results of dilation (1st step) and a zoom in;

FIGS. 12a and 12b illustrate the results of erosion (2nd step) and a zoom in;

DETAILED DESCRIPTION OF THE EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1:
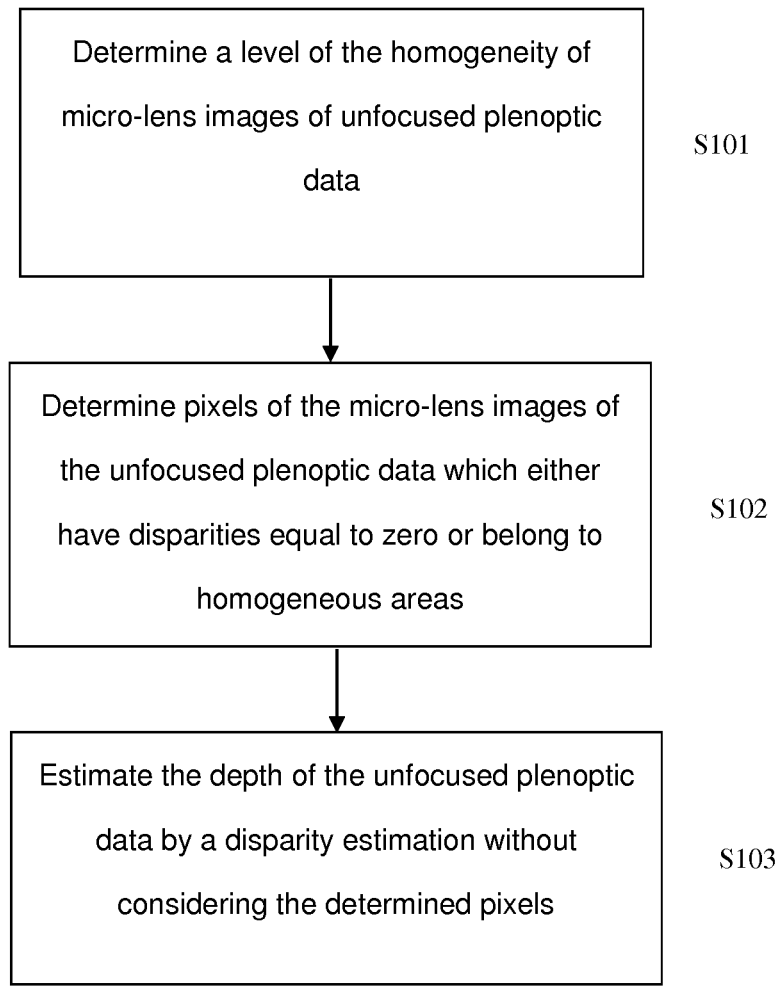
FIG. 1 is a flowchart of a method for estimating the depth of unfocused plenoptic data according to an embodiment of the present disclosure.

FIG. 1 is a flowchart of a method for estimating the depth of unfocused plenoptic data according to an embodiment of the present disclosure.

At step S101, a level of the homogeneity of micro-lens images of unfocused plenoptic data is determined.

The level of the homogeneity can be determined by reconstructing a matrix of estimated metrics from the plenoptic data, which is a representation of the light field. After estimating the homogeneity measure for each micro-lens image (e.g., by calculating the standard deviation, or sum of the energy of the signal in the high frequency bands of DCT transform), the estimation for each micro-lens image is assigned to all of the pixels of that microlens, therefore every pixel in the raw data has a homogeneity measure assigned to it. The collection of these pixels gives a homogeneity image similar to the raw data in dimensions.

In an example of the reconstruction of the matrix of views (and similarly the matrix of metrics from the homogeneity image), different images of a scene from different points of view are firstly extracted from the captured data, for example, by: (i) estimating from the raw data the position of the center of each micro-lens; and (ii) demultiplexing the view (u,v) for all of the angular ocoordinates (u,v) by extracting the pixel at the spatial position (u,v) in every micro-lens image. Here, a micro-lens image corresponds to the image which is formed under each micro-lens on the sensor. The raw data here refer to data collected by the camera, which have not been subjected to processing.It refers to the unfocused plenoptic data in this embodiment.

In this embodiment, the demultiplexing methods are used for reconstructing the matrix. But it should be noted that it is not limited to demultiplexing and other suitable method may also apply.

Figure 2:
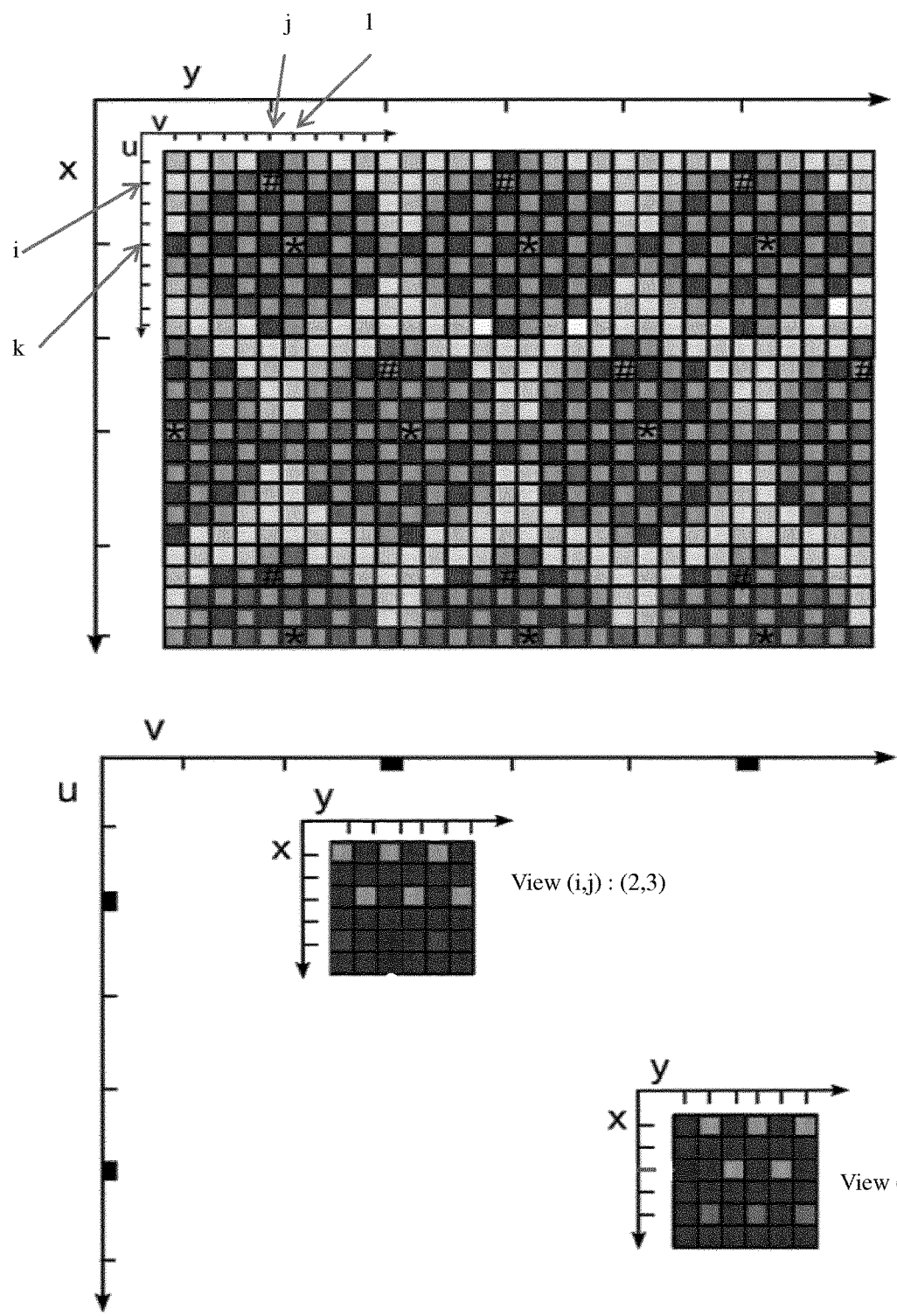
FIG. 2 illustrates view demultiplexing.

FIG. 2 illustrates view demultiplexing that can be applied to the plenoptic raw data, or to the created homogeneity image. . It can be appreciated that a view demultiplexing addresses the data conversion from the 2D raw image to the matrix of views. The demultiplexing process consists in reorganizing the pixels of the raw image in such a way that all pixels capturing the light rays with a certain angle of incidence are stored in the same image creating the so-called views. Each view is a projection of the scene under a different angle. The set of views create a block matrix where the central view store the pixels capturing the light rays that pass through the central portion of the main lens and hit the sensor. In fact, the angular information of the light rays is given by the relative pixel positions in the micro-lens images with respect to the micro-lens-images centers. So in FIG. 2, the view (2,3) is created by taking the pixels marked by "#" from the raw data. The second part of FIG. 2 shows two demultiplexed views at the angular coordinates (2,3) and (5,6).

A more detailed process in this respect is provided in the reference 1. It should be noted that the matrix of metrics is only one example for exploiting the level of the homogeneity. Any other suitable homogeneity estimation method can be used for this purpose. For example, the calculation can be done directly on the unfocused plenoptic data, without creating the matrix of metrics. In addition, as described below, the embodiment of the disclosure provides only two examples for the determination of the microlens image homogeneity (the standard deviation and the high frequency energy of DCT transform). However, any other approaches can be used, for example using second order statistics, co-occurrence matrices.

At step S102, pixels of the micro-lens images of the unfocused plenoptic data which either have disparities equal to zero or belong to homogeneous areas as a function of the level of homogeneity of the micro-lens images of the unfocused plenoptic data are determined.

Further details of the determination will be given in the example below.

With step S102, the structure of the unfocused plenoptic data captured by the unfocused plenoptic camera will be exploited to anticipate (i) the pixels that belong to the parts of the scene that are in focus (estimated disparities of these pixels are equal to zero), or (ii) the pixels that belong to non-textured areas of the scene.

At step S103, the depth of the unfocused plenoptic data by a disparity estimation is estimated without considering the pixels determined by step S102. This can be particularly advantageous on devices with low computational powers, for example mobile phones, where the burden of disparity estimation is lowered without the loss of accuracy.

Any suitable known disparity estimation methods can be used in the step S103, such as the one based on Epipolar Images of the scene disclosed in the reference 2. A Maximum a posteriori approach for disparity estimation was disclosed in the reference written by T. E. Bishop and P. Favaro, "Full-resolution depth map estimation from an aliased plenoptic light field", ACCV 2010 (hereinafter referred to as reference 3), which can also be used in the step S103.

For explaining the method of the embodiment, let us consider first the pixels belonging to highly textured areas of view $I_{i,j}$ with reference to FIG. 2. Here, view $I_{i,j}$ denotes the view in the row i, and column j of the matrix of views. A non-zero disparity value d for pixel (x,y) on view $I_{i,j}$ means that on another view of the scene $I_{k,j}$ (view $I_{k,l}$ denotes the view in the row k, and column I of the matrix of views), the same scene point is sampled at pixel coordinates (x+d*[k−i], y+d*[j−l]). That is, the same scene point is sampled in a different microlens image when the views are changed, as shown in FIG. 2. It means that if the micro-lens image centered at (x,y) is homogeneous, we can deduce that the imaged scene point is sampled at the same spatial coordinates (x,y) on all of the views. This also exclusively means that the camera lens is focused on that textured part of the scene.

For non-textured areas, even if a 3D point is captured at different spatial coordinates on different, the displacement cannot be estimated using the above mentioned block-matching approaches. The block matching approaches try to locally estimate the displacement by comparing pixel intensities which are more or less the same in homogenous areas. In such cases, it is useless to try to estimate the pixel disparities. The disparities for such homogenous areas are initiated as 0.

According to the method of the embodiment of the disclosure, by pre-processing the raw data, it can prevent any disparity estimation method to spend time on estimating disparities for: (i) pixels that are in focus, (ii) pixels that belong to homogenous areas of the scene. Therefore, the method removes the computational costs of disparity estimation on homogeneous areas, as well as in-focus areas of the captured scene. It also reduces the amount of foreground fattening introduced by disparity estimation methods that are based on block-matching solutions.

Figure 3:
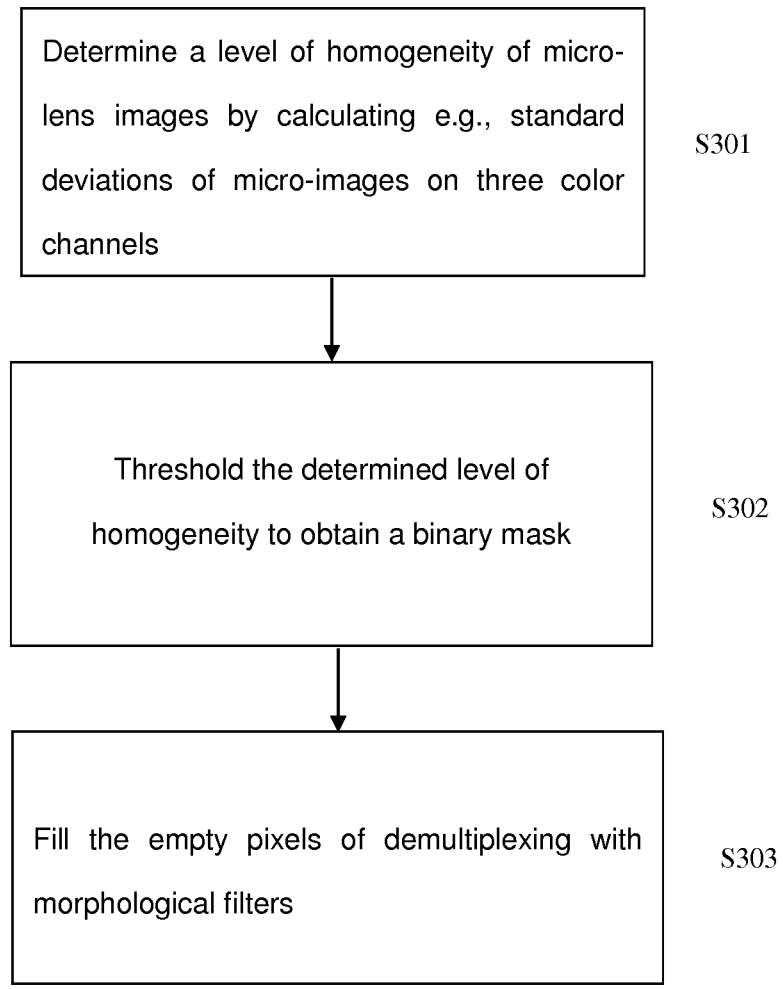
FIG. 3 is a flowchart of a process for estimating disparity of plenoptic data captured by an unfocused plenoptic camera.

Next, a process for determining the level of homogeneity of microlens images of unfocused plenoptic data captured by unfocused plenoptic camera will be described in details. FIG. 3 is a flowchart illustrating the process of obtaining the mask that contains 1 for non-homogeneous microlens images, and 0 for the homogeneous microlense images. At step S301, a level of homogeneity of micro-lens images is determined for example according to the standard deviations of microlens images on three color channels.

In this embodiment, it is proposed to calculate standard deviation among all of the pixels of each microlen image on three color channels. In one embodiment, the estimation for each micro-lens image is assigned to all of the pixels of the corresponding microlens, therefore every pixel in the raw data has a homogeneity measure assigned to it. The collection of these pixels gives a homogeneity image similar to the raw data in dimensions.

It shall be noted that the method of the process of FIG. 3 preferably works when the vignetting of the camera is approximately circumvented by any valid approach. The correction of vignetting can be done using different methods and the detail of vignetting correction is out of the focus of this disclosure. In one embodiment, the provided images, the raw data is divided by the white image corresponding to the same focus and zoom of the camera to correct vignetting.

Figure 4:
FIG. 4 illustrates an image obtained by a Lytro camera.

FIG. 4 illustrates an image obtained by a known Lytro camera.

Figure 5:
FIG. 5 illustrates the raw data after correction of vignetting by division by white image.

FIG. 5 illustrates the raw data after the correction of vignetting by division by the corresponding white image. The main drawback of having vignetting is the difference of the illumination in the matrix of views, i.e., the peripheral sub-aperture views are low illuminated. Currently, this illumination difference is reduced by dividing the raw data by a corresponding white image. The reason for using a corresponding white image is that the position of the microlens images on the sensor depends on the camera parameters, e.g., zoom and focus of the camera, and therefore an image of a flat white scene gives the maximum achievable capture for each pixel for each camera parameter set. The values on the white image therefore provide the weighting coefficients that are due to vignetting.

Figure 6:
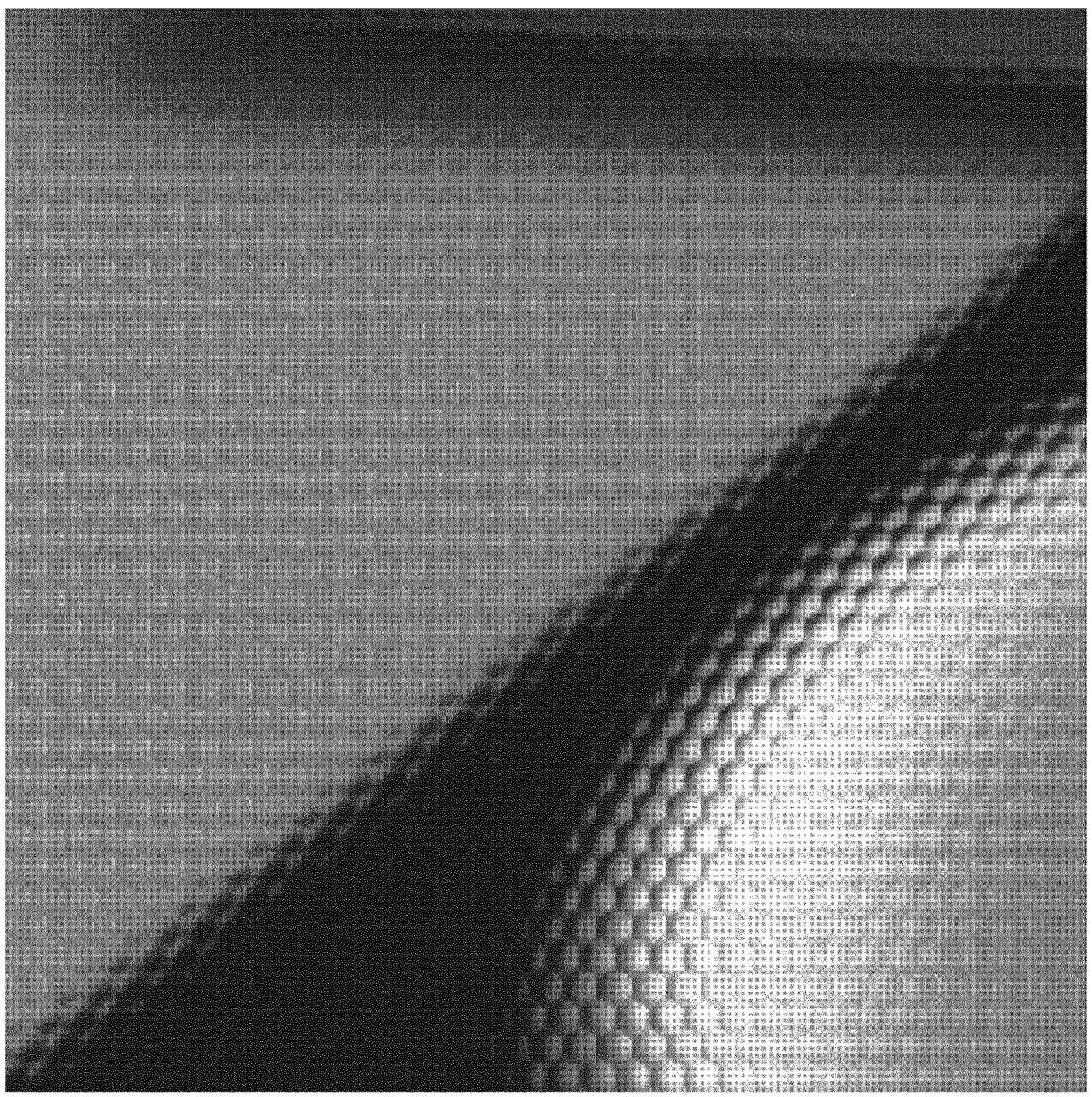
FIG. 6 illustrates a zoom-in at the area shown by the rectangle in FIG. 3.

FIG. 6 illustrates a zoom-in at the area shown by the rectangle in FIG. 5. In FIG. 6, the inhomogeneity of the micro-lens images on high frequencies and out of focus parts of the scene are shown.

To be able to evaluate the level of homogeneity of micro-lens images, the 3 color channels will be treated separately in this embodiment.

Figure 7A:
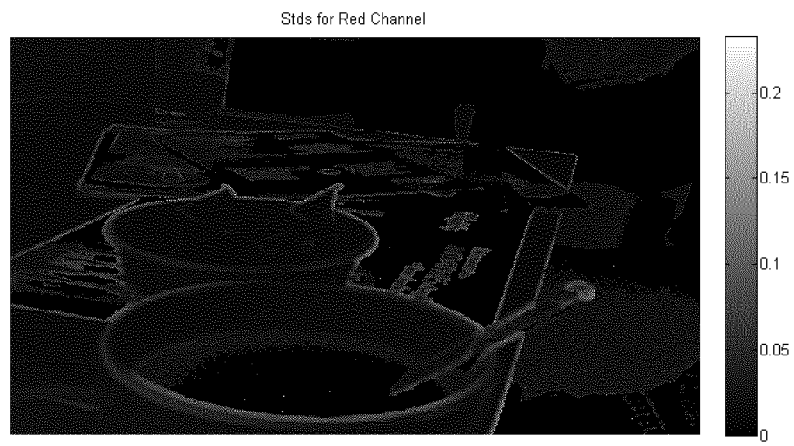
Figure 7B:
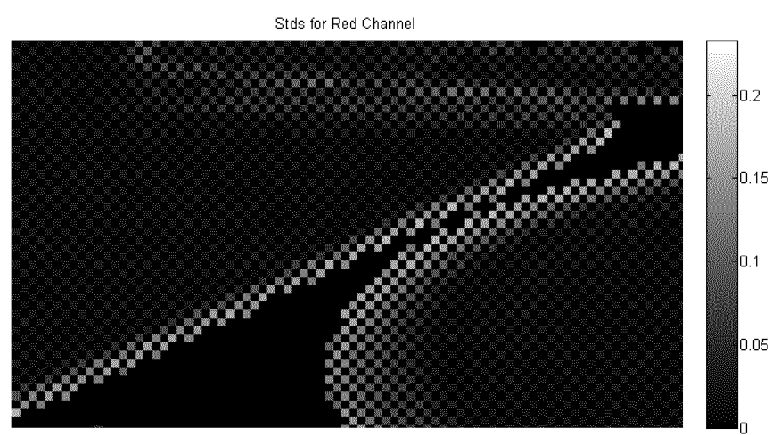

The micro-lens image centers can be estimated, for example, using the method described in the reference 1. Then, with the micro-lens image centers, every micro-lens image is considered, and 3 color channels of that image are independently normalized in terms of energy. On every channel, the standard deviation (Std) of the normalized pixels is calculated. In one embodiment, the estimated homogeneity metric (the standard deviation) is assigned to all of the micorlens image pixels which are then stored in the corresponding color channel of the output homogeneity image. In one embodiment, this homogeneity image is then demultiplexed to obtain the matrix of metric views. FIGS. 7a and 7b illustrate one standard deviation metric view obtained for the Red channel and a zoom in. As shown in FIGS. 7a and 7b, only the pixels in red channel are considered. The standard deviation of the red pixels are calculated per micro-lens image. As described below, with the demultiplexing in this embodiment, empty pixels will be inserted to address sampling, and therefore we have pixels with no standard deviations.

Figure 8A:
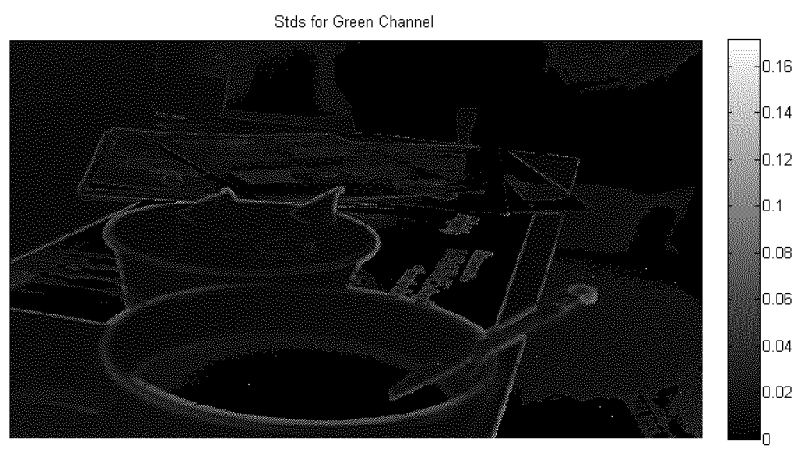
Figure 8B:
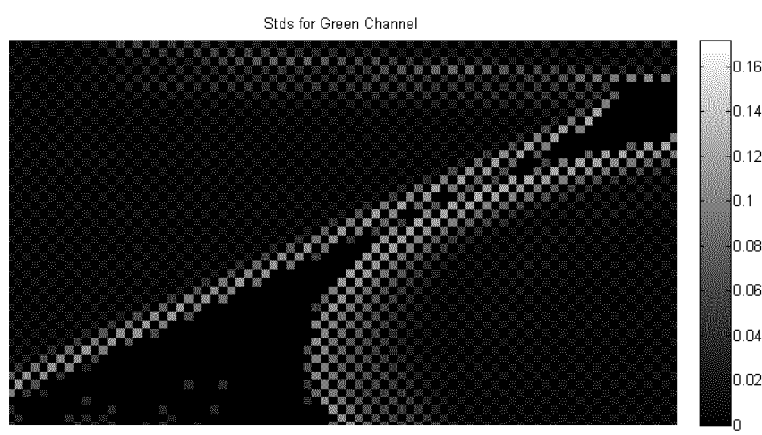

FIGS. 8a and 8b illustrate the standard deviation matrix for the Green channel and a zoom in. Similar to the red channel, only the pixels in green channel of the microlens images are considered.

Figure 9A:
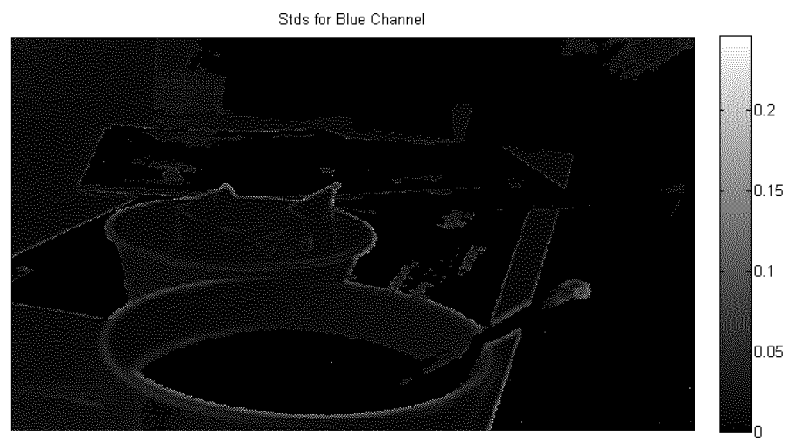
Figure 9B:
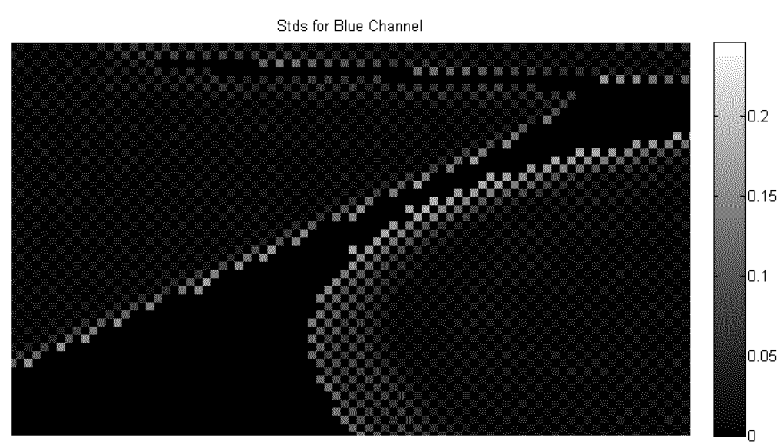

FIGS. 9a and 9b illustrate the standard deviation matrix for the Blue channel and a zoom in. Only the pixels in blue channel are considered. At step S302, the results of step S301 is subject to a thresholding to obtain a binary mask, showing which pixels are estimated to either have disparities equal to zero or belong to homogeneous areas. In one embodiment, this binary mask has the same demuliplexing pattern as an extracted view to properly address sampling of the light field.

Considering the fact that for every pixel, three standard deviations are estimated to address the color channels separately, it is proposed to threshold these values simultaneously to merge the information into a single-channel decision mask.

To do so, for every channel a threshold on the standard deviation is set. Next, for every pixel of the metric matrix, if all three color values are less than the set thresholds, the output binary mask at that position is set to 0. Otherwise, the binary mask is set to 1.

Figure 10A:
Figure 10B:
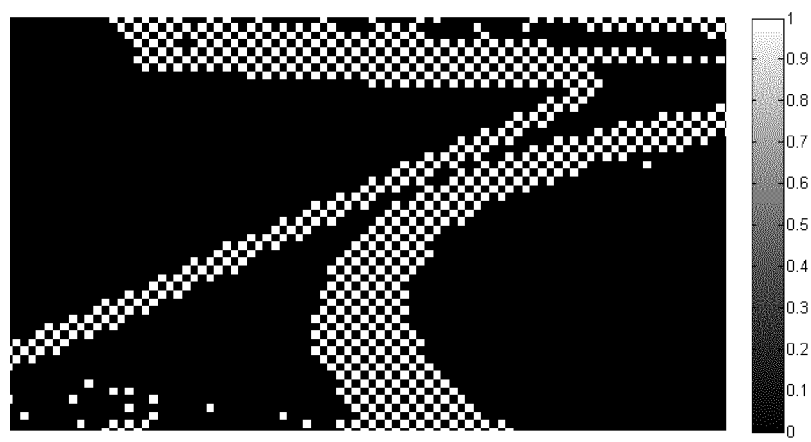

FIGS. 10a and 10b illustrate the thresholded binary mask for one view and a zoom in. It can be appreciated that in natural images, the chromatic channels correlate in patterns, which means that similar high frequency contents can be seen in the three channels. That is why in one embodiment the three channels are thresholded simultaneously.

At step S303, the empty pixels of demultiplexing are filled with morphological filters. This can be also performed on the matrix of metrics.

In the step S303, it applies morphological filtering to fill the empty pixels that are inserted to address the sampling, regarding their neighboring pixels. This can be also performed on the matrix of metrics. The result of this step can be used to decide whether the disparities should be estimated or not.

Both of the metric matrix obtained by the step S301 and the binary mask obtained by the step S302 follow the demultiplexing pattern of the light field, i.e., empty pixels are inserted in positions of non-existing micro-lenses to follow the sampling of the light field. As compared to the case that directly uses the binary mask obtained by the step S301 for the decision making on disparity estimation, this embodiment with the additional steps S302 and S303 reduces the computational costs of disparity estimation.

According to one embodiment, a morphological filtering is applied on the results of the step S302 to fill in the empty pixels according to their neighboring pixels. This is needed when a demultiplexing (such as what is discussed in the reference 1) is used. Next, a more detailed description will be given in this step.

In one embodiment, a structure element (SE) as a 2 by 2 matrix of ones is defined, and (1st) the binary mask is dilated by such structure element SE; and (2nd) the results of the 1st step are eroded by the same structure element SE. The combination of these two steps is called the morphological closing of the mask.

Figure 11A:
Figure 11B:

FIGS. 11a and 11b illustrate the results of dilation (1st step) and a zoom in.

Figure 12A:
Figure 12B:

FIGS. 12a and 12b illustrate the results of erosion (2nd step) and a zoom in.

The result image contains only 0s and 1s, where 0s addresses the determined pixels for which it is already known that disparity estimation is not necessary and 1s refers to pixels for which the disparity estimation is needed.

The result of step S303 can be used in any disparity estimation method to estimate the depth of the unfocused plenoptic data. Thus, the depth will be estimated by the disparity estimation without considering the determined pixels which either have disparities equal to zero or belong to homogeneous areas.

On the image shown in FIG. 4, the results shows that the disparity estimation is not required for more than 70% of the pixels.

Next a disparity map which is generated with the method of this embodiment will be compared with the one without using this method.

Figure 13:
FIG. 13 illustrates an image showing the estimated disparities using the block matching method described in the reference 1 without using the method of the embodiment of the disclosure.

FIG. 13 illustrates an image showing the estimated disparities using the block matching method described in the reference 1 without using the method of the embodiment of the disclosure.

Figure 14:
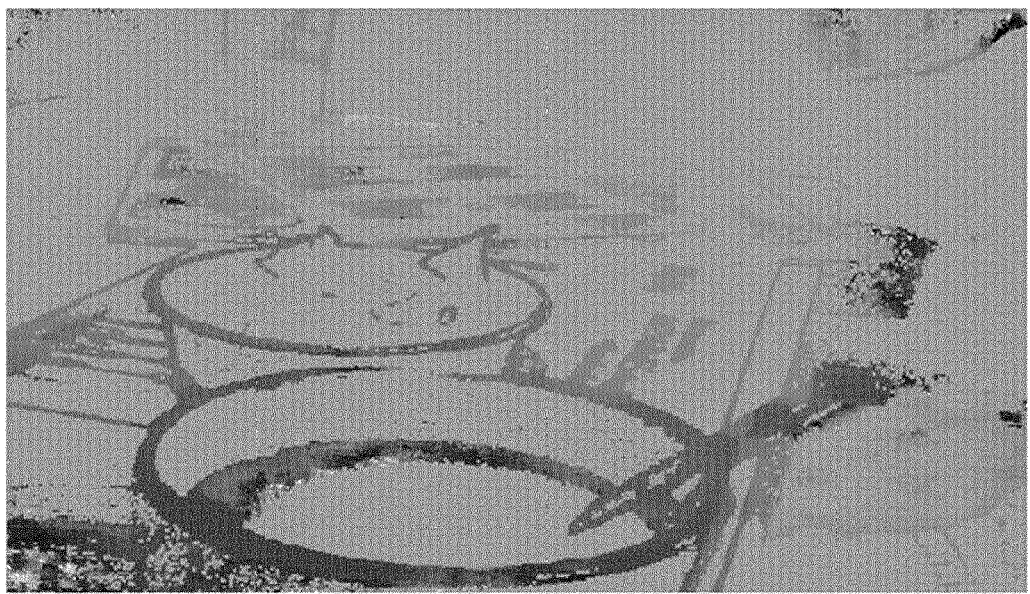
FIG. 14 illustrates an image showing the estimated disparities considering this anticipation step.

FIG. 14 illustrates an image showing the estimated disparities with the method of the embodiment of the disclosure. As shown in FIG. 14, a smaller number of pixels require disparity estimation compared with the case in FIG. 13. These pixels are well-detected to contain high frequencies on out of focus parts of the scene. Besides, the foreground fattening of the block matching method is removed, which can be observed by looking at the thin edges on this disparity map, compared to the ones in FIG. 13.

In the case that the block matching method described in the reference 1 is used for the depth estimation, the accuracy of the results is increased, thanks to the proposed preprocessing module of disparity anticipation. The block matching methods suffer from foreground fattening effect, meaning that the estimated disparities on the scene edges are accurate, but moving away from the edges in a close neighborhood, the disparities of the background pixels are mistakenly estimated as equal to the disparity of edges, i.e., the edges on the disparity maps are fattened. This results in having wrong disparity values of the background around the edges of foreground. The embodiments of the disclosure can prevent the disparity map from such inaccuracies by accurately detecting the edges and blurred high frequencies, and discarding the disparity estimation elsewhere.

Figure 15:
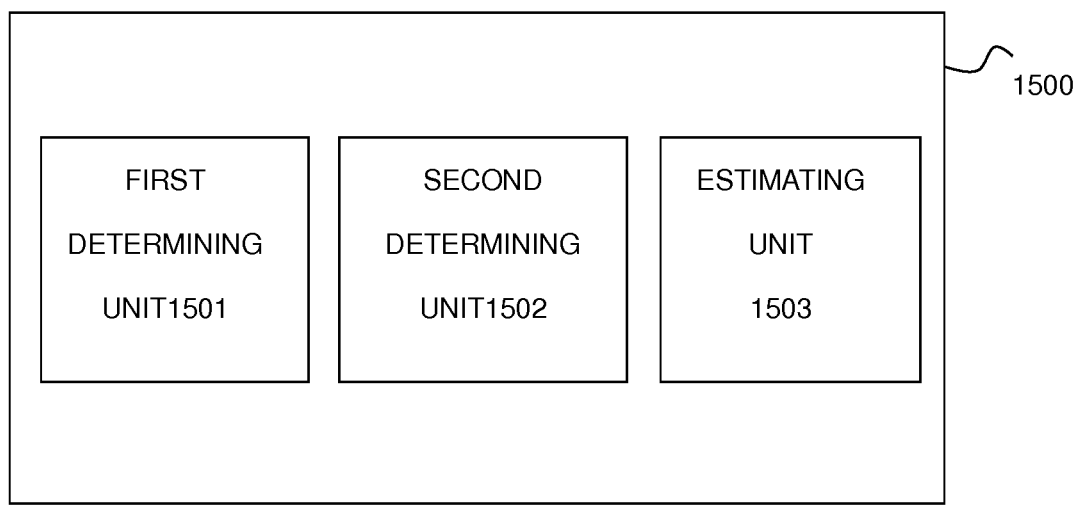
FIG. 15 is a block diagram of an apparatus for estimating the depth of unfocused plenoptic data according to an embodiment of the present disclosure.

FIG. 15 is a block diagram of an apparatus for estimating a depth of unfocused plenoptic data according to an embodiment of the present disclosure.

As shown in FIG. 15, the apparatus 1500 for estimating the depth of unfocused plenoptic data comprises a first determining unit 1501 for determining a level of the homogeneity of micro-lens images of unfocused plenoptic data.

The apparatus 1500 further comprises a second determining unit 1502 for determining pixels of the micro-lens images of the unfocused plenoptic data which either have disparities equal to zero or belong to homogeneous areas as a function of the calculated level of homogeneity of the micro-lens images of the unfocused plenoptic data.

The apparatus 1500 further comprises an estimating unit 1503 for estimating the depth of the unfocused plenoptic data by the disparity estimation without considering the determined pixels.

The apparatus 1500 can be used for the post processing of unfocused plenoptic data captured by a plenoptic camera. For this purpose, the apparatus 1500 can be embedded in the plenoptic camera or provided as a separate device.

It is to be understood that the present disclosure may be implemented in various forms of hardware, software, firmware, special purpose processors, or a combination thereof. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method for calculating a depth of unfocused plenoptic data, comprising:
    determining a level of homogeneity of micro-lens images of unfocused plenoptic data;
    determining pixels of the micro-lens images of the unfocused plenoptic data which either have disparities equal to zero or belong to homogeneous areas as a function of the determined level of homogeneity of the micro-lens images of the unfocused plenoptic data; and
    obtaining the depth of the unfocused plenoptic data by using pixels of the micro-lens images of the unfocused plenoptic data excluding the determined pixels.

2. The method according to claim 1, wherein the level of the homogeneity of microlens images is determined by calculating a measure of homogeneity from each microlens image, and assigning the calculated metric to all of the pixels of the corresponding microlens image.

3. The method according to claim 1, wherein the level of the homogeneity of microlens images is determined by calculating standard deviations of the pixels in that microlens image on three color channels, and assigning the calculated metric to all of the pixels of the corresponding microlens image.

4. The method according to claim 1, wherein the level of the homogeneity of microlens images is determined from a matrix of views of the unfocused plenoptic data to represent the light field of the views, by calculating a measure of homogeneity of the corresponding pixels of each microlens image on the plurality of views in the matrix of views on three color channels.

5. The method according to claim 4, wherein the matrix of view is determined by:
    calculating from the unfocused plenoptic data a position of a center of each micro-lens of a plenoptic camera capturing the unfocused plenoptic data; and
    demultiplexing for all angular coordinates (u,v) the corresponding view (u,v) of the unfocused plenoptic data by extracting from every microlens image the pixel at the spatial coordinate (u,v) with respect to the center of every micro-lens image.

6. The method according to claim 1, wherein the level of the homogeneity of microlens images is determined by calculating a measure of homogeneity considering the corresponding pixels for each microlens image in the matrix of views, and assigning the calculated metric to all of the pixels of the corresponding pixels for each microlens image.

7. The method according to claim 5, wherein the pixels are determined by thresholding the values in the determined homogeneity image.

8. The method according to claim 1, wherein the pixels are determined by thresholding the values in the determined matrix of metric views.

9. An apparatus for calculating a depth of unfocused plenoptic data, comprising:
    a first determining unit for determining a level of homogeneity of micro-lens images of unfocused plenoptic data;
    a second determining unit for determining pixels of the micro-lens images of the unfocused plenoptic data which either have disparities equal to zero or belong to homogeneous areas as a function of the calculated level of homogeneity of the micro-lens images of the unfocused plenoptic data; and
    a unit for obtaining the depth of the unfocused plenoptic data by using pixels of the micro-lens images of the unfocused plenoptic data excluding the determined pixels.

10. The apparatus according to claim 9, wherein the first determining unit is configured to determine the level of the homogeneity by calculating a measure of homogeneity from each microlens image, and assigning the calculated metric to all of the pixels of the corresponding microlens.

11. The apparatus according to claim 10, wherein the first determining unit is configured to determine the level of the homogeneity of microlens images from a matrix of views of the unfocused plenoptic data to represent the light field of the views, by calculating a measure of homogeneity of the corresponding pixels of each microlens image on the plurality of views in the matrix of views on three color channels.

12. The apparatus according to claim 11, wherein the first determining unit is configured to determine the matrix of views by:
    calculating from the unfocused plenoptic data a position of a center of each micro-lens of a plenoptic camera capturing the unfocused plenoptic data; and demultiplexing for all angular coordinates (u,v) the corresponding view (u,v) of the unfocused plenoptic data by extracting from every microlens image the pixel at the spatial coordinate (u,v) with respect to the center of every micro-lens image.

13. The apparatus according to claim 12, wherein the second determining unit is configured to determine pixels by thresholding the determined matrix of metrics.

14. Computer program comprising program code instructions executable by a processor for implementing the steps of the method according to claim 1.

15. Computer program product which is stored on a non-transitory computer readable medium and comprises program code instructions executable by a processor for implementing the steps of the method according to claim 1.

* * * * *

UNITED STATES PATENT AND TRADEMARK OFFICE
CERTIFICATE OF CORRECTION

PATENT NO. : 10,510,156 B2
APPLICATION NO. : 15/531408
DATED : December 17, 2019
INVENTOR(S) : Mozhdeh Seifi, Neus Sabater and Valter Drazic It is certified that error appears in the above-identified patent and that said Letters Patent is hereby corrected as shown below:

In the Claims

At Column 12, Line 17, Claim no. 5, delete "coordiantes" and insert --coordinates--

Signed and Sealed this
Fourteenth Day of February, 2023

Katherine Kelly Vidal
*Director of the United States Patent and Trademark Office*